United States Patent Office 3,198,704
Patented Aug. 3, 1965

3,198,704
ETHYL LINOLEATE EMULSIONS FOR
PARENTERAL INJECTION
Krishnabandhu Nath Roy, Calcutta, India, assignor to
Martin & Harris (Private) Limited, Calcutta, West
Bengal, India, a company of India
No Drawing. Filed Sept. 25, 1961, Ser. No. 140,244
3 Claims. (Cl. 167—65)

This invention relates to a pharmaceutical preparation and it is based on the discovery that an aqueous emulsion of ethyl linoleate can be used as parenteral injection for curring ailments where a high plasma-cholesterol level of the blood is indicated.

Based on this discovery this invention consists of a pharmaceutical preparation comprising an aqueous emulsion of ethyl linoleate.

The said emulsion may be prapared by using glycerol mono-stearate as the emulsifying agent.

It is found that the presence of glucose as an additional ingredient enhances the stability of the said emulsion.

The emulsification should be carried out in an atmosphere of inert gas, e.g., nitrogen, with vigorous stirring until the globules are of the size $1\mu$ observed under the microscope.

After emulsification, the emulsified product should be stored in amber coloured containers and sterilzed in an autoclave at a pressure of 15 lbs. per sq. inch.

The process of emulsification is illustrated in the example given below:

EXAMPLE

The ingredients required for preparing the emulsion are as follows:

Ethyl linoleate _____ g__ 50
Glycerol monostearate _____ g__ 1.25
Glucose _____ g__ 5
Redistilled water, to make up to 100 cc.

A mixture of the above-mentioned ingredients is poured into a round bottomed 250 cc. flask fitted with an electrical stirrer and stirred vigorously for about 3 hours in an atmosphere of inert gas (nitrogen) until the size of the globules becomes $1\mu$, observed under the microscope. When the emulsion is completely made, it is filled in amber coloured containers and sterilised in an autoclave at a pressure of 15 lbs. per sq. inch.

An emulsion preparted in the manner described above is suitable for parenteral injection in all cases of ailments where high plasma-cholesterol level of the blood is indicated.

This will be evident from the experiments described below:

EXPERIMENTS

These experiments were carried out on rabbits, rats and monkeys.

In the experiments carried out on rabbits (eight animals) the cholesterol contents of their blood were ascertained as explained in the Tables 1 to 7 given below:

Data on animal experiments

TABLE NO. 1.—Cholesterol content of the blood before lesion is induced

[Animals: 8 rabbits]

| Serial No. of animals | Body weight in kg. | Free cholesterol per 100 cc. blood in mg. | Total cholesterol per 100 cc. blood in mg. | General condition and other remarks |
|---|---|---|---|---|
| 1 | 0.979 | 69.4 | 139.0 | Good health. |
| 2 | 1.569 | 87.8 | 132.8 | |
| 3 | 1.183 | 75.3 | 136.3 | |
| 4 | 1.331 | 74.8 | 138.3 | |
| 5 | 0.795 | 66.6 | 126.8 | |
| 6 | 0.815 | 68.3 | 131.7 | |
| 7 | 1.009 | 79.5 | 136.5 | |
| 8 | 1.089 | 78.7 | 135.4 | |

TABLE NO. 2.—Cholesterol content after lesion is induced for a period of 35 days while feeding of the lesion producing chemicals is stopped

[Animals: 6 rabbits]

| Serial No. of Animals | Body weight in kg. | Free cholesterol per 100 cc. blood in mg. | Total cholesterol per 100 cc. blood in mg. | Other remarks |
|---|---|---|---|---|
| 1 | 0.860 | 198.3 | 430.8 | General condition very weak. |
| 2 | 1.460 | 236.3 | 525.9 | General condition very weak. 4 legs paralysed. |
| 3 | 1.086 | 206.9 | 485.1 | Very weak. |
| 4 | 1.236 | 219.1 | 478.3 | Do. |
| 5 | 0.751 | 185.2 | 400.6 | Very weak.[1] |
| 6 | 0.768 | 179.3 | 402.1 | Do.[1] |
| 7 Control | | | | |
| 8 Control | | | | |

[1] Control.

TABLE No. 3.—Cholesterol content after 21 hours of intravenous injection of 1 cc. emulsion containing 50 mg. ethyl linoleate, while feeding of the lesion producing chemicals is stopped.

[Animals: 3 rabbits (induced)]

| Serial No. of Animals | Body weight in kg. | Free cholesterol per 100 cc. blood in mg. | Total cholesterol per 100 cc. blood in mg. | Other remarks |
|---|---|---|---|---|
| 1 | 0.860 | 108.7 | 261.6 | General condition better. |
| 2 | 1.480 | 151.5 | 393.9 | Better, tries to stand. |
| 3 | 1.086 | 98.6 | 240.3 | Better. |

TABLE NO. 4.—Cholesterol content after 117 hours of the 1st injection. During this period 250 mg. ethyl linoleate in emulsion is injected intravenously at an interval of 24 hours at the rate of 1 cc. per injection containing 50 mg. of ester, while feeding of the lesion producing chemicals is stopped.

[Animals: 3 rabbits (induced)]

| Serial No. of Animals | Body weight in kg. | Free cholesterol per 100 cc. blood in mg. | Total cholesterol per 100 cc. blood in mg. | Other remarks |
|---|---|---|---|---|
| 1 | 0.860 | 69.9 | 140.1 | Better. |
| 2 | 1.473 | 86.2 | 138.2 | Better, can stand on legs. |
| 3 | 1.087 | 73.8 | 139.6 | Better. |

TABLE NO. 5.—Cholesterol content after 168 hours of the 1st injection and after injecting a total of 300 mg. ethyl linoleate, while feeding of the lesion producing chemicals is stopped.

[Animals: 3 rabbits (induced)]

| Serial No. of Animals | Body weight in kg. | Free cholesterol per 100 cc. blood in mg. | Total cholesterol per 100 cc. blood in mg. | Other remarks |
|---|---|---|---|---|
| 1 | 0.860 | 63.1 | 80.7 | Better. |
| 2 | 1.473 | 74.3 | 83.3 | Better, can move. |
| 3 | 1.088 | 72.3 | 110.1 | Better. |

TABLE NO. 6.—Control of the induced rabbits. Cholesterol content and other conditions of the animal after inducing the lesions; feeding of the lesion producing chemicals is stopped on the 35th day from start but no injection is given. Cholesterol count taken on the 37th day.

[Animals: 3 rabbits (induced)]

| Serial No. of Animals | Body weight in kg. | Free cholesterol per 100 cc. blood in mg. | Total cholesterol per 100 cc. blood in mg. | Other remarks |
|---|---|---|---|---|
| 4 | 1.236 | | | Died in the morning of the 37th day. |
| 5 | 0.752 | 185.0 | 398.6 | Died on the 45th day (morning). |
| 6 | 0.760 | 178.0 | 400.3 | Died on the 42nd day (evening). |

TABLE NO. 7.—Control rabbits that are not induced nor injected. Cholesterol content on the 37th day.

[Animals: 2 rabbits]

| Serial No. of Animals | Body weight in kg. | Free cholesterol per 100 cc. blood in mg. | Total cholesterol per 100 cc. blood in mg. | Other remarks |
|---|---|---|---|---|
| 7 | 1.185 | 73.8 | 133.8 | Normal condition. |
| 8 | 1.134 | 78.3 | 133.7 | Do. |

From the data given in Table 4, the curative dose for the treatment of animals may be fixed at 170 mg. ethyl linoleate in emulsion per kg. body weight of the animal.

It will also be evident from Tables 8, 9 and 10 that by injecting 10 times the curative dose by weight at a time according to the body weight of the animals in normal health as stated above, no toxic effect was noticed.

TABLE No. 8.—Toxicity

[Animals: 3 rats. Injection given in tail vein.]

| Serial No. of rats | Body wt. in kg. | Curative dose in mg. | 1st injection of ester in mg. | 2nd injection of ester in mg. | Total m.g. ester injected |
|---|---|---|---|---|---|
| 1 | 0.236 | 40.12 | 325 | 500 | 825 |
| 2 | 0.228 | 38.76 | 375 | 700 | 1,075 |
| 3 | 0.211 | 35.87 | 350 | 700 | 1,050 |

REMARKS.—The Rat Nos. 1 and 2 are both alive and are in good health even after injecting 20–27 times of their curative doses in multiple injection and about 10 times at a time.

TABLE No. 9.—Toxicity

[Animals: 3 rabbits. Injection given in the ear vein.]

| Serial No. of rabbits | Body wt. in kg. | Curative dose in mg. | 1st injection of ester in mg. | 2nd injection in mg. | Total quantity injected in mg. |
|---|---|---|---|---|---|
| 1 | 1.705 | 289 | 750 | 500 | 2,940 |
| 2 | 1.477 | 251 | 500 | 500 | 2,500 |
| 3 | 1.400 | 238 | 250 | 250 | 2,750 |

REMARKS.—The rabbits tolerate a high range of dose over their curative dose at a time and more than 10 times of their curative doses in multiple injection.

TABLE NO. 10.—Toxicity

[Animals: 3 monkeys. Intramuscular injection given.]

| Serial No. of monkeys | Body wt. in kg. | Curative dose in mg. | 1st injection in mg. | 2nd injection in mg. | Total injection in mg. |
|---|---|---|---|---|---|
| 1 | 3.86 | 656.2 | 800 | 2,500 | 6,500 |
| 2 | 3.00 | 510 | 750 | 750 | 5,500 |
| 3 | 3.00 | 510 | 1,625 | 2,000 | 5,500 |

REMARKS.—Save a slight inflammation at the site of the injected muscles there is no toxic effect observed.

It can therefore be inferred that the emulsion is absolutely harmless for parenteral use.

The results were obtained by experiments carried out intravenously upon rats and rabbits; intramuscularly upon monkeys.

What I claim is:

1. A pharmaceutical preparation for parenteral injection consisting essentially of an aqueous emulsion of ethyl linoleate and containing glycerol monostearate as the emulsifying agent.

2. A pharmaceutical preparation for parenteral injection consisting essentially of aqueous emulsion of ethyl linoleate which contains glucose as an additional ingredient.

3. A pharmaceutical composition consisting of:

| | |
|---|---|
| Ethyl linoleate _____ g__ | 50 |
| Glycerol monostearate _____ g__ | 1.25 |
| Glucose _____ g__ | 5 |

Redistilled water, to make up to 100 cc.

References Cited by the Examiner

UNITED STATES PATENTS 2,728,706  12/55  Barsky _____ 167—66
2,867,565  1/59  Feinstone _____ 167—66

FOREIGN PATENTS 522,213  2/56  Canada.

OTHER REFERENCES

Gorens, J. of Lab. and Clin. Med., vol. 34, No. 11, p. 1627 (1949).
Hauge, Chem. Abst., vol. 53, p. 11557(t), 1959.
Kinsell, Chem. Abst., vol. 52, p. 11201(t), 1958.
Merck Index, 7th Ed., 1960, p. 490.
Richter's, Organic Chem. vol. 1, Blakiston's Son and Co., 1919, p. 301.
Taupitz, Chem. Abst., vol. 51, p. 7585(a), 1957.

JULIAN S. LEVITT, Primary Examiner.

IRVING MARCUS, LEWIS GOTTS, Examiners.